(12) United States Patent
Notargiacomo et al.

(10) Patent No.: US 9,966,987 B2
(45) Date of Patent: May 8, 2018

(54) RADIO FREQUENCY SWITCHING SYSTEM

(71) Applicant: TEKO TELECOM S.r.l., Castel San Pietro Terme (IT)

(72) Inventors: Massimo Notargiacomo, Castel San Pietro Terme (IT); Davide Durante, Castel San Pietro Terme (IT)

(73) Assignee: Teko Telecom S.r.l., Castel San Pietro Terme (IT)

( * ) Notice: Subject to any disclaimer, the term of this patent is extended or adjusted under 35 U.S.C. 154(b) by 0 days. days.

(21) Appl. No.: 15/301,644

(22) PCT Filed: Apr. 3, 2015

(86) PCT No.: PCT/IB2015/052456
§ 371 (c)(1),
(2) Date: Oct. 3, 2016

(87) PCT Pub. No.: WO2015/151067
PCT Pub. Date: Oct. 8, 2015

(65) Prior Publication Data
US 2017/0026072 A1    Jan. 26, 2017

(30) Foreign Application Priority Data
Apr. 3, 2014  (IT) .............................. MO2014A0091

(51) Int. Cl.
*H04B 1/48* (2006.01)
*H04W 52/02* (2009.01)

(52) U.S. Cl.
CPC ............ *H04B 1/48* (2013.01); *H04W 52/028* (2013.01); *Y02B 60/50* (2013.01)

(58) Field of Classification Search
CPC combination set(s) only.
See application file for complete search history.

(56) References Cited

U.S. PATENT DOCUMENTS 5,584,053 A    12/1996   Kommrusch et al.
6,434,368 B1   8/2002    Stadmark
(Continued)

FOREIGN PATENT DOCUMENTS

EP   0723338 A2   7/1996

OTHER PUBLICATIONS

International Search Report and Written Opinion dated Jun. 30, 2015 from International Patent Application No. PCT/IB2015/052456, filed Apr. 3, 2015.

*Primary Examiner* — Junpeng Chen
(74) *Attorney, Agent, or Firm* — Sunstone IP

(57) ABSTRACT

The radio frequency switching system comprises an input/output terminal connectable to a radio frequency antenna, a receiving terminal, a transmission terminal, a group of diodes operatively interposed between the input/output terminal, the receiving terminal and the transmission terminal, at least a selection device between a receiving configuration, in which the input/output terminal is operatively connected to the receiving terminal, and a transmission configuration, wherein the input/output terminal is operatively connected to the transmission terminal, and a DC/DC voltage converter operatively connected to the group of diodes and able to generate a predetermined output voltage.

8 Claims, 4 Drawing Sheets

(56) References Cited

U.S. PATENT DOCUMENTS

2004/0171356 A1\* 9/2004 Uriu .................. H04B 1/005
    455/83
2015/0035710 A1\* 2/2015 Lin .................. H01Q 1/283
    343/745

\* cited by examiner

RADIO FREQUENCY SWITCHING SYSTEM

CROSS REFERENCE TO RELATED APPLICATION(S)

This application is a U.S. National Stage Entry of International Patent Application No. PCT/IB2015/052456, filed Apr. 3, 2015, which claims the benefit of Italian Patent Application No. MO2014A000091, filed Apr. 3, 2014, the disclosures of which are hereby incorporated entirely herein by reference.

BACKGROUND

Technical Field

The present disclosure relates to a radio frequency switching system.

Background Art

Radio frequency switching systems, commonly known as RF switches, are widely used in the telecommunications sector and may be used for a whole range of different purposes.

An RF switch generally performs the two main functions of receiving and transmitting and is piloted as a function of input and external conditions.

One of the main problems to be faced with reference to high power RF switches is that of energy consumption, which must necessarily be limited in order to obtain an optimized RF switch.

FIG. 1 and FIG. 2 show a possible embodiment of an RF switch of known type made using PIN diodes, in a receiving configuration and in a transmission configuration, respectively. Such embodiment shown in the illustrations represents a possible example and is not the only possible embodiment.

Exploiting the potential difference $V_L$, a current I, approximately equal to about 100 mA, runs through a resistance R and reaches the section of the PIN diodes D1, D2, D3 and D4.

The high-frequency resistance R is inversely proportionate to the polarization direct current that crosses the diode. A high current crossing the diode is necessary to obtain a low resistance to such high frequency.

In the receiving configuration of the RF switch, shown in FIG. 1, the PIN diode D1 is forward biased (crossed by a current $I_{FWD}$) and, therefore, in low resistance for the RF signal and the circuit closes to ground in the left portion, making the RF Rx port active.

Thanks to the high potential difference $V_H$, in such configuration all the other PIN diodes D2, D3 and D4 are reverse biased and act as high resistance for the RF signal, thus preventing the flow of current through them.

In the transmission configuration of the RF switch, shown in FIG. 2, the PIN diodes D2, D3 and D4 are forward biased, while the diode D1 is reverse biased. In such case, therefore, the current flows to the right, making the port RF Tx active.

In the receiving configuration, considering a potential difference $V_L$=5V and a potential difference $V_H$=28V, with I=100 mA, the consumption of energy is equal to about $P_{diss}=V_L \times I$=0.5 W and this is a consumption value that can be considered reasonable for this state of operation.

In particular, this is due to the quantity of power dissipated by the forward-biased resistance, used to regulate the flow of current generated by the potential difference $V_L$.

On the other hand, the consumption of energy in the transmission configuration, considering a potential difference $V_L$=5V and a potential difference $V_H$=28V, with I=100 mA, it is equal to about $P_{diss}=V_L \times I+V_H \times I$=0.5 W+2.8 W=3.3 W and is considerably high.

In particular, in this configuration as well, such consumption is due to the portion of power dissipated by the forward-biased resistance which is used to regulate the flow of current.

In such case, nevertheless, the potential difference $V_H$ is much higher because it is used to operate the PIN diodes in reverse bias to act as high resistance for high-frequency RF signals.

SUMMARY

The main aim of the present disclosure is to provide a radio frequency switching system which ensures a low consumption of energy, in particular able to significantly reduce the consumption of energy in the transmission configuration.

Another object of the present disclosure is to provide a radio frequency switching system which allows to overcome the mentioned drawbacks of the prior art within the ambit of a simple, rational, easy and effective to use as well as affordable solution.

The above mentioned objects are achieved by the present radio frequency switching system according to the characteristics of claim 1.

BRIEF DESCRIPTION OF THE DRAWINGS

Other characteristics and advantages of the present disclosure will become better evident from the description of a preferred, but not exclusive embodiment of a radio frequency switching system, illustrated by way of an indicative, but not limitative example in the accompanying drawings wherein.

DETAILED EMBODIMENTS

Figure 1:
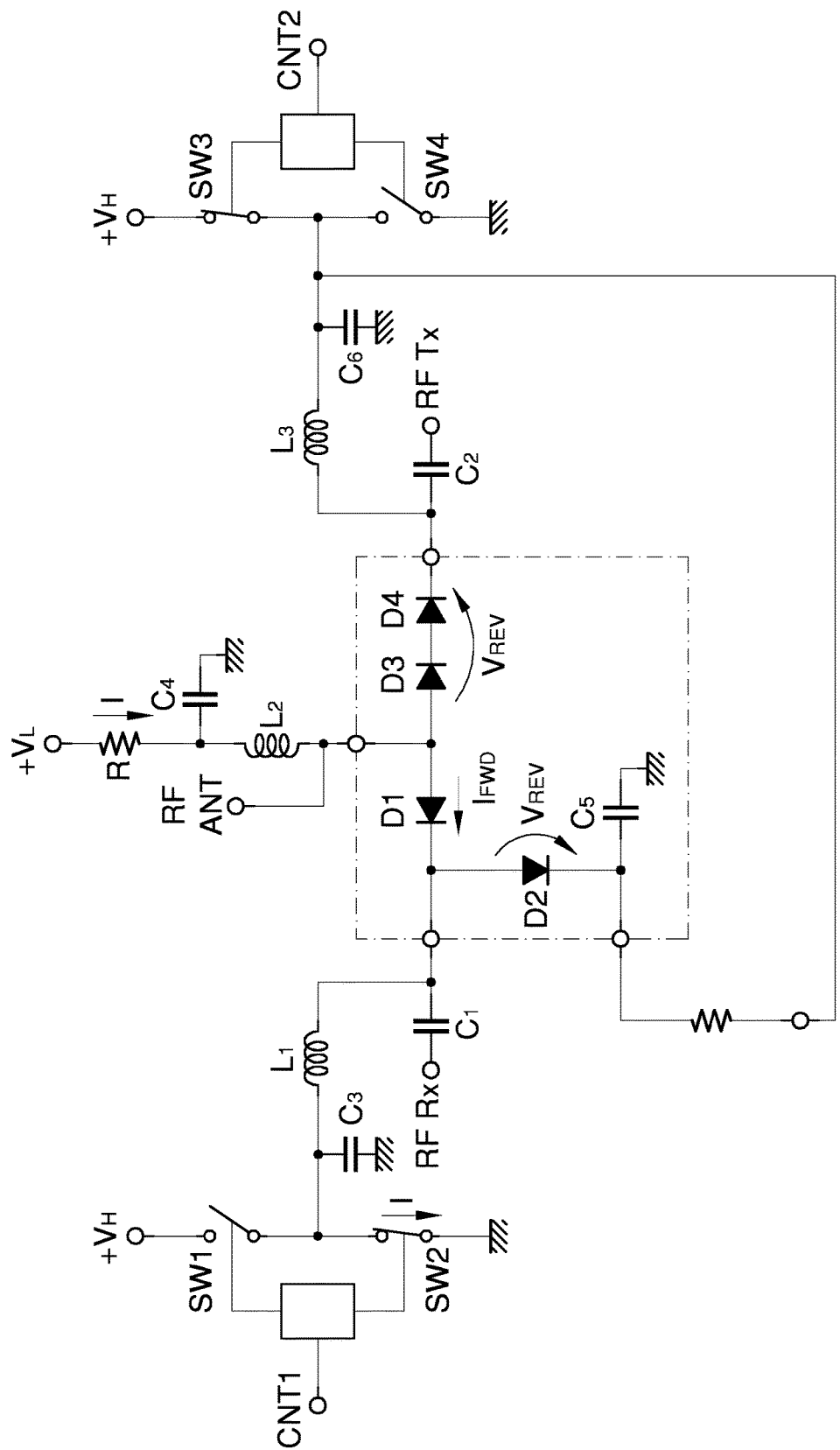
FIG. 1 is a general electric diagram of a radio frequency switching system of the known type in a receiving configuration.
Figure 2:
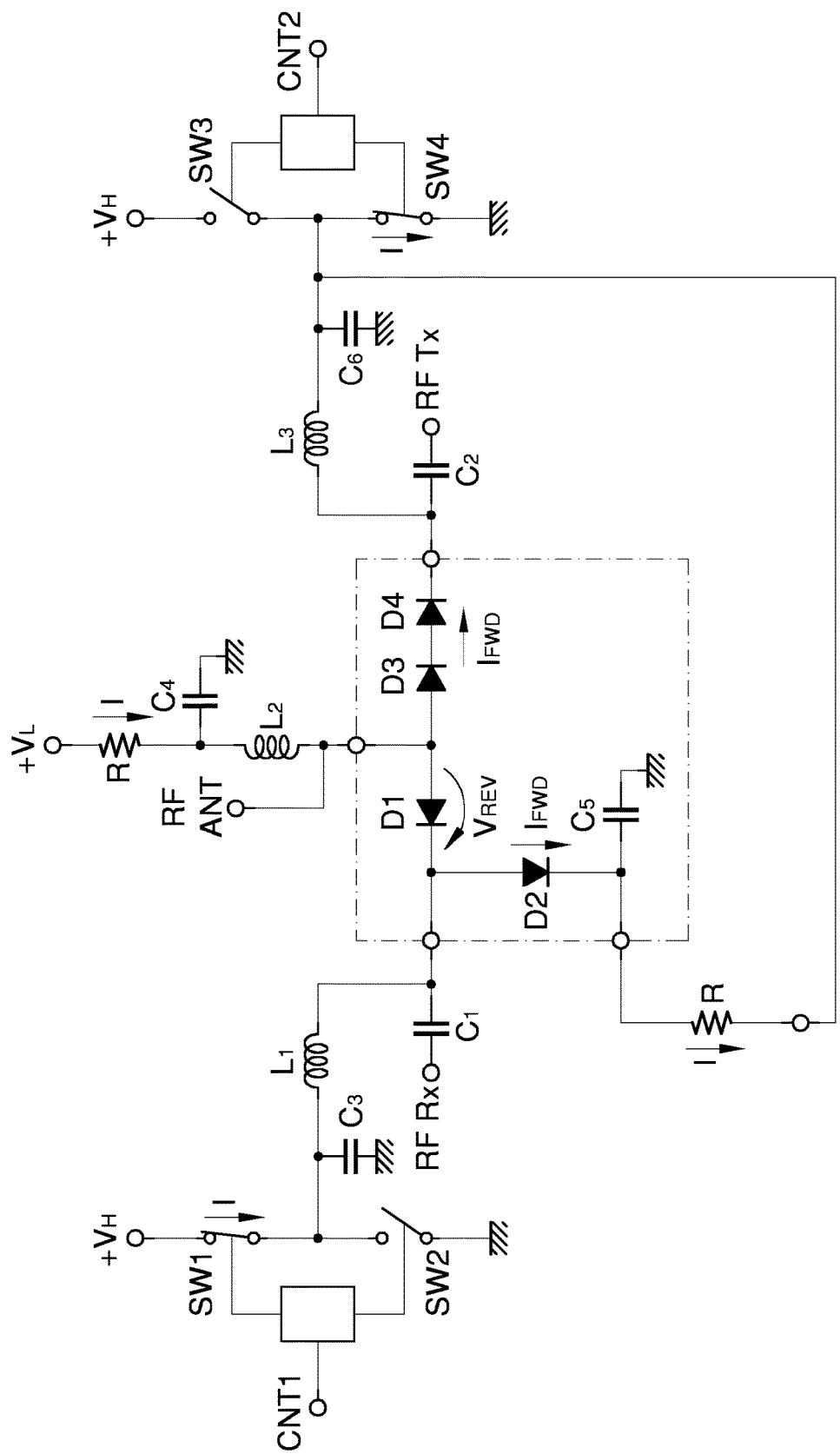
FIG. 2 is a general electric diagram of a radio frequency switching system of the known type in a receiving configuration.

With particular reference to such illustrations, S globally indicates a radio frequency switching system, commonly known as RF switch, which can be used in the telecommunications sector.

The simplest switch structure known as Single Pole Multi-Throw (SPnT) is that of the switch of the Single Pole Double Throw (SPDT) type, wherein a single signal input line can be connected to one of the two output lines.

In particular, the transmission and receiving switches are a specific type of switch SPDT used to connect the antenna to the transmitter and to the receiver alternately.

With reference to the particular but not sole embodiment shown in the illustrations, the switch S consists of a broad band switch of the SPDT type and comprises three suitable bias-tee circuits connected to an input/output terminal RF ANT connectable to an RF antenna, to a receiving terminal RF Rx connectable to a receiver and to a transmission terminal RF Tx connectable to the transmitter, respectively.

Such circuits also have:
- bypass condensers C1 and C2 connected in series to the receiving terminal RF Rx and to the transmission terminal RF Tx;
- inductors L1, L2 and L3 in series to the reference supplies $V_H$ and $V_L$;
- shunt condensers C3, C4, C5 and C6 connected to ground.

In particular, the circuit connectable to the RF antenna is supplied by a first reference voltage $V_L$, while the circuits connectable to the transmitter and to the receiver are supplied by a second reference voltage $V_H$.

The switch S also comprises a group of PIN diodes D1, D2, D3 and D4 suitably connected to the bias-tee circuits and operatively interposed between the input/output terminal RF ANT, the receiving terminal RF Rx and the transmission terminal RF Tx.

In particular, the first diode D1 has the anode connected to the input/output terminal RF ANT and the cathode connected to the receiving terminal RF RX, with interposition of the condenser C1, the second diode D2 has the anode connected to the cathode of the first diode D2 and the cathode connected to the condenser C5 to ground, the third diode D3 has the anode connected to the input/output terminal RF ANT and the cathode connected to the anode of the fourth diode D4, while the fourth diode D4 has the cathode connected to the transmission terminal RF Tx, with interposition of the condenser C2.

During the use of the switch S the diodes D1, D2, D3 and D4 are alternately forward and reverse biased.

More specifically, when the receiver is on (and the transmitter is off), the first diode D1 is forward biased, while the second, the third and the fourth diodes D2, D3 and D4 are reverse biased.

On the contrary, when the transmitter is on (and the receiver is off), the first diode D1 is reverse biased, while the second, the third and the fourth diodes D2, D3 and D4 are forward biased.

The purpose therefore is to switch the PIN diodes D1, D2, D3 and D4 between a state of low impedance, wherein they are forward biased and a state of high impedance, wherein they are reverse biased.

The switch S also comprises at least a selection device between at least a receiving configuration, wherein the input/output terminal RF ANT is operatively connected to the receiving terminal RF Rx, and at least a transmission configuration, wherein the input/output terminal RF ANT is operatively connected to the transmission terminal RF Tx.

Such switching is done by means of suitable switches SW1, SW2, SW3 and SW4 and is commanded by means of control signals TTL sent to control ports CNT1 and CNT2.

In particular, a first and a second switch SW1 and SW2 are operatively connected to a first control port CNT1, while a third and a fourth switch SW3 and SW4 are operatively connected to a second control port CNT2.

Figure 3:
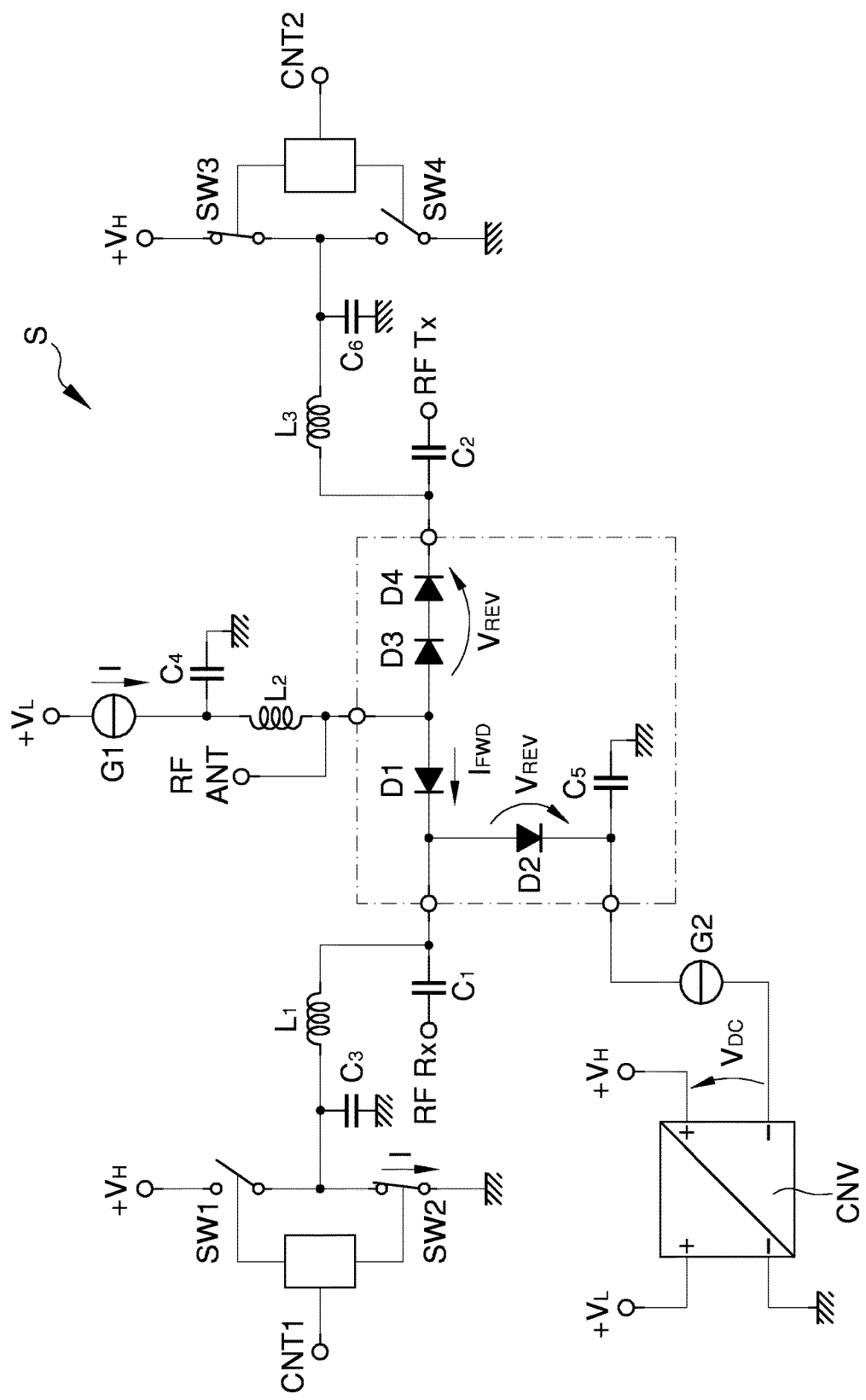
FIG. 3 is a general electric diagram of the radio frequency switching system according to the disclosure in a receiving configuration.
Figure 4:
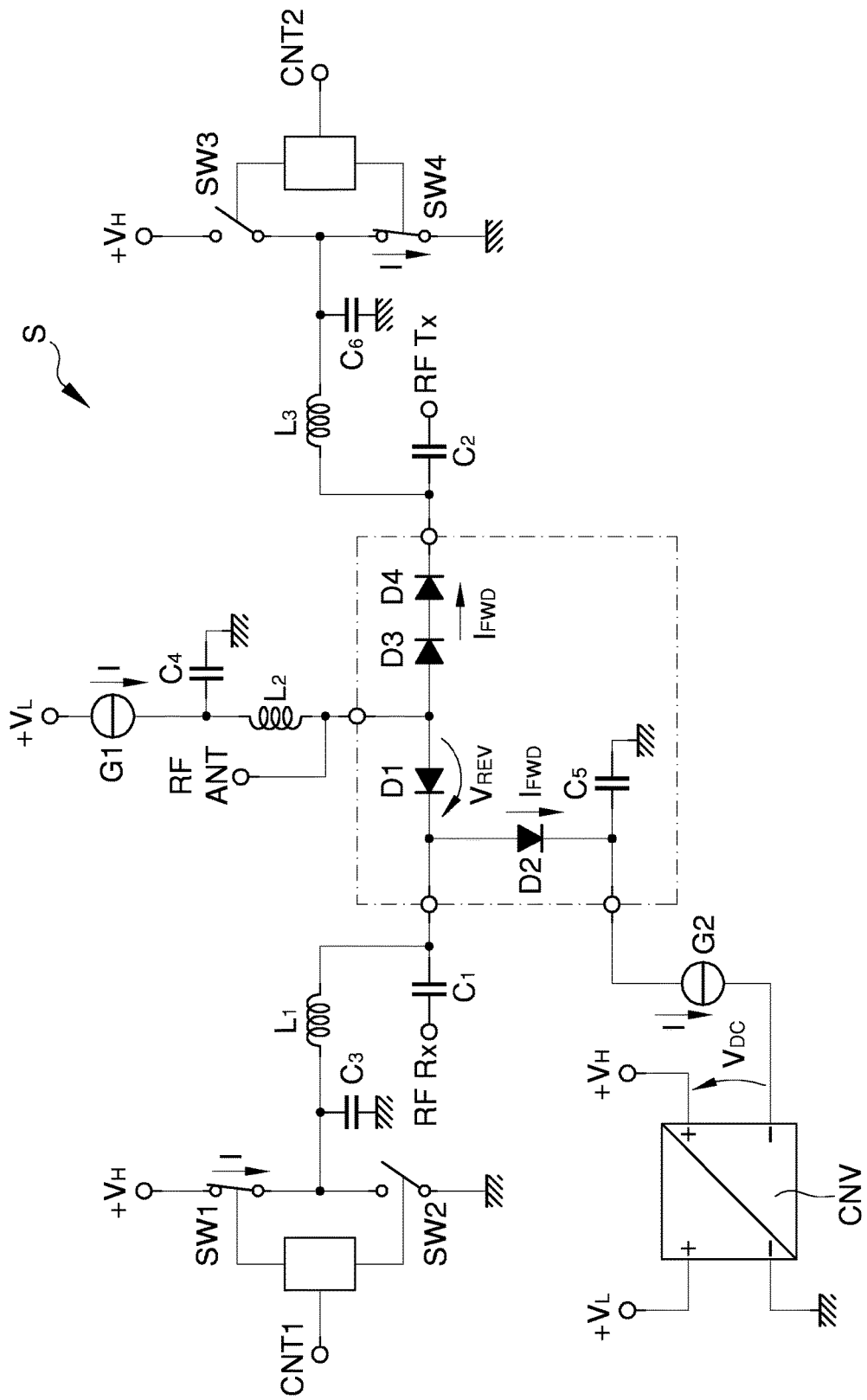
FIG. 4 is a general electric diagram of the radio frequency switching system according to the disclosure in a receiving configuration.

Advantageously, the switch S comprises the following additional components:
- a DC/DC voltage converter, altogether indicated in the FIGS. 3 and 4 by the reference CNV and operatively connected to the group of PIN diodes D1, D2, D2 and D4;
- a first and a second current generator, indicated in the FIGS. 3 and 4 respectively by the references G1 and G2.

In particular, the voltage converter CNV has in input the voltage $V_L$ and in output a voltage $V_{DC}$ very similar to $V_L$.

Because the voltage converter C is isolated, it can undergo the potential difference $V_H$.

The first current generator G1 is inserted on the circuit connected to the input/output terminal RF ANT and connected to the reference voltage $V_L$.

The second current generator G2 is placed between the output of the voltage converter CNV and the group of PIN diodes. In particular, the second current generator G2 is connected to the cathode of the second diode D2.

The use of the current generators G1 and G2 allows the constant flow in the circuit of a current (equal to about 100 mA) irrespective of the value $V_L$, which can therefore be lower with respect to circuits of known type. This way, the dissipation of heat is lower than that of known solutions.

The current that flows through the PIN diodes D1, D2, D3 and D4 in transmission configuration (shown in FIG. 4) comes from the generator G1, G2 which has a lower potential difference.

Consequently, the dissipation of heat is much lower than that which would occur using the circuit in the standard configuration, wherein the current is regulated by a resistance with a greater potential difference $V_H$.

In the receiving configuration (shown in FIG. 3) the consumption of energy is only slightly less to that relating to a circuit solution of known type.

In particular, considering a potential difference $V_L=3.3V$, a potential difference $V_H=28V$, with I=100 mA, the dissipated power is equal to about $P_{diss}=V_L \times I=0.33$ W.

The considerable advantage provided by the switch S according to the disclosure is evident in the transmission configuration, wherein the dissipation is considerably less compared to the circuit solution of known type.

In particular, considering a potential difference $V_L=3.3V$, a potential difference $V_H=28V$, a $V_{DC}=3.3$ with I=100 mA, and a performance $\eta$ of the converter CNV equal to 0.5, it is equal to about $P_{diss}=V_L \times I+(V_{DC} \times I)/\eta=0.33$ W+0.66 W and it is substantially equal to 1 W.

It has in practice been observed how the described disclosure achieves the intended objects.

The invention claimed is:

1. A radio frequency switching system, comprising:
   at least an input/output terminal connectable to at least a radio frequency antenna;
   at least a receiving terminal;
   at least a transmission terminal;
   at least a group of diodes operatively interposed between said input/output terminal, said receiving terminal and said transmission terminal;
   at least a selection device between at least a receiving configuration, in which said input/output terminal is operatively connected to said receiving terminal, and at least a transmission configuration, wherein said input/output terminal is operatively connected to said transmission terminal; and
   at least a DC/DC voltage converter operatively connected to said group of diodes and able to generate a predetermined output voltage,
   wherein said at least one selection device comprises at least a first and a second control port, and
   wherein said at least one selection device comprises at least a first and a second switch operatively connected to said first control port.

2. The system according to claim 1, comprising at least a current generator operatively connected to said group of PIN diodes and able to generate a constant current.

3. The system according to claim 2, comprising a first current generator and a second current generator.

4. The system according to claim 1, wherein said group of diodes comprises at least a PIN diode.

5. The system according to claim 1, wherein said at least one selection device comprises at least a third and a fourth switch operatively connected to said second control port.

6. The system according to claim 1, wherein said group of PIN diodes comprises a first diode connected to said input/output terminal and to said receiving terminal, a second diode connected to said first diode, a third diode connected to said input/output terminal and a fourth diode connected to said third diode and to said transmission terminal.

7. The system according to claim 6, wherein in said receiving configuration said first diode is forward biased, while said second, third and fourth diode are reverse biased.

8. The system according to claim 7, wherein in said transmission configuration said first diode is reverse biased, while said second, third and fourth diode are forward biased.

* * * * *